(12) United States Patent
Swenson

(10) Patent No.: US 8,392,945 B2
(45) Date of Patent: Mar. 5, 2013

(54) SYSTEM AND METHOD FOR CONTROLLING ALTERNATIVE ACCESS TO VIDEO EVENTS ASSOCIATED WITH VIDEO BROADCAST SERVICES

(75) Inventor: Erik Swenson, Englewood, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 593 days.

(21) Appl. No.: 12/263,585

(22) Filed: Nov. 3, 2008

(65) Prior Publication Data

US 2010/0115544 A1 May 6, 2010

(51) Int. Cl.
*G06F 3/00* (2006.01)
*G06F 13/00* (2006.01)
*H04N 5/445* (2011.01)

(52) U.S. Cl. .......................................... 725/38; 725/28
(58) Field of Classification Search ...................... 725/38
See application file for complete search history.

(56) References Cited

U.S. PATENT DOCUMENTS

| | | | |
|---|---|---|---|
| 6,005,562 A * | 12/1999 | Shiga et al. | 715/721 |
| 6,108,365 A | 8/2000 | Rubin et al. | |
| 7,073,189 B2 | 7/2006 | McElhatten et al. | |
| 2006/0107285 A1 | 5/2006 | Medvinsky | |
| 2007/0173325 A1 | 7/2007 | Shaw et al. | |
| 2008/0163304 A1 * | 7/2008 | Ellis | 725/50 |
| 2009/0178074 A1 | 7/2009 | Ellis | |
| 2009/0235315 A1 * | 9/2009 | Sharkey et al. | 725/68 |
| 2010/0083301 A1 | 4/2010 | Swenson | |

OTHER PUBLICATIONS

European Telecommunications Standards Institute and European Broadcasting Union "Digital Video Broadcasting (DVB); Specification for Service Information (SI) in DVB Systems," ETSI EN 300 468 v1.7.1, May 2006.
USPTO "Non-Final Office Action" mailed Dec. 27, 2010; U.S. Appl. No. 12/240,600, filed Sep. 29, 2008.
USPTO "Final Office Action" mailed Jun. 14, 2011; U.S. Appl. No. 12/240,600, filed Sep. 29, 2008.

* cited by examiner

*Primary Examiner* — Robert Hance
(74) *Attorney, Agent, or Firm* — Ingrassia Fisher & Lorenz, P.C.

(57) ABSTRACT

A video services receiver system and related operating methods provide alternative event information to a customer who is subject to a blackout for a desired event. If the blacked out content is available via a different event on a different service, the system will find the other event and provide an appropriate notification to the customer. A method of providing access to events by a customer associated with a video services receiver begins by identifying a first event on a first service, the first event corresponding to a first presentation of content. The method continues by retrieving an alternative event identifier for the first event and using the alternative event identifier to search for a second event on a second service, the second event corresponding to a second presentation of the content. Thereafter, the method generates an alternative event notification for the customer. The alternative event notification indicates availability of the second event for access by the customer.

10 Claims, 5 Drawing Sheets

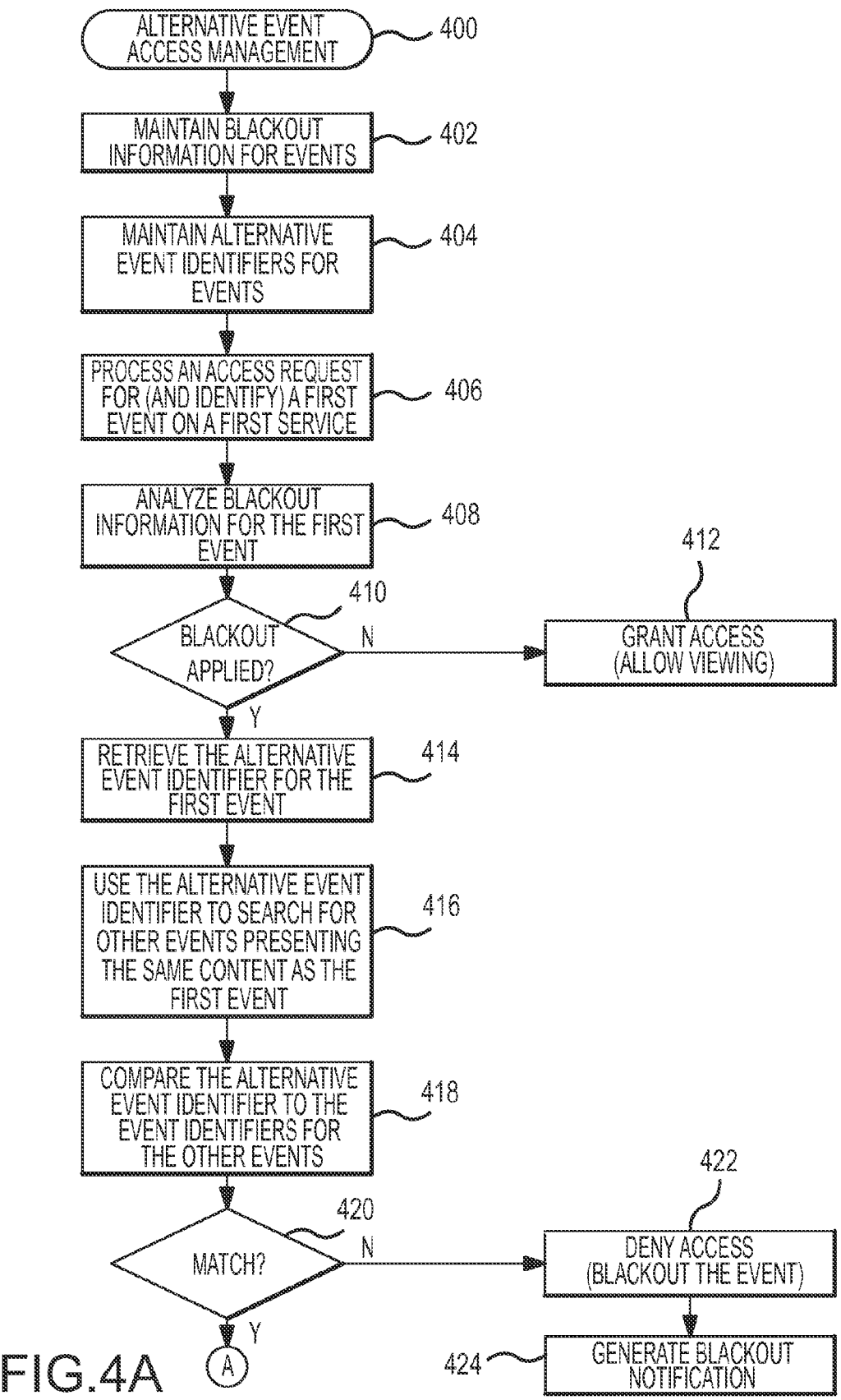

SYSTEM AND METHOD FOR CONTROLLING ALTERNATIVE ACCESS TO VIDEO EVENTS ASSOCIATED WITH VIDEO BROADCAST SERVICES

TECHNICAL FIELD

Embodiments of the subject matter described herein relate generally to digital video systems such as satellite video systems. More particularly, embodiments of the subject matter relate to controlling customer access to alternative video events that convey the same content.

BACKGROUND

Most television viewers now receive their video signals through a content aggregator such as a cable or satellite television provider. In the typical instance, encoded television signals are sent via a cable or wireless data link to the viewer's home, where the signals are ultimately decoded in a set-top box or other consumer device. The decoded signals can then be viewed on a television or other appropriate display as desired by the viewer.

Digital video broadcasting (DVB) systems, such as satellite systems, are generally known. The terms "service" and "event" are often used when referring to video programming delivered via a satellite system. In this context, a "service" represents a sequence of programs under the control of a broadcaster (or service provider), where a "service" can be broadcast in accordance with a predetermined schedule, and an "event" represents a grouping of elementary broadcast data streams having a defined start time and a defined end time belonging to a common service. In this regard, a "service" is akin to a traditional television broadcast channel, and an "event" is akin to a scheduled television show broadcast on a television channel.

DVB systems are often used to broadcast live events such as sporting events, concerts, fundraisers, ceremonies, speeches, and the like. A sporting event (and other events) can be subjected to blackout rules such that viewers in certain geographical regions are denied access to the event, while viewers in other geographical regions are allowed to view the event. For example, a viewer in Denver, Colo. may be authorized to view a live broadcast of a Los Angeles Lakers basketball game, while viewers in Los Angeles, Calif. may be denied access to that game. Conversely, viewers in Denver may be subjected to a blackout for a Denver Nuggets basketball game, while viewers in Los Angeles may be permitted to watch that game. Satellite systems have traditionally employed blackout data to control access to events that are subjected to blackout rules. Blackout data is processed by the customer's set-top box, which determines whether or not the customer has access rights to view certain events.

Depending upon the available services and access rights of the customer, an event that is blacked out on one service might be available for viewing on a different service. For example, a live game that is blacked out on a first service might be available for unrestricted viewing on a second service. If the customer attempts to access the event on the first service, the set-top box will deny access and generate a blackout notification. Unless the customer has prior knowledge of the accessible event on the alternative service or searches available program listings, he or she will miss the event.

BRIEF SUMMARY

The techniques and systems described herein alleviate the shortcomings of the prior art by providing a mechanism by which alternative video events that correspond to the presentation of the same content can be identified for access by a customer. The identification of alternative events in this manner is particularly beneficial when a requested event is blacked out on one service, but is otherwise available for viewing on a different service. In practice, the set-top box can provide a notification to the customer, which enables the customer to tune to a different service to view the requested event.

The above and other aspects may be carried out by an embodiment of a method of providing access to events by a customer associated with a video services receiver. The method involves: identifying a first event on a first service, the first event corresponding to a first presentation of content; retrieving an alternative event identifier for the first event; using the alternative event identifier to search for a second event on a second service, the second event corresponding to a second presentation of the content; and generating an alternative event notification for the customer, the alternative event notification indicating availability of the second event for access by the customer.

The above and other aspects may be carried out by an embodiment of a satellite video services receiver that is configured to receive video content and to control access to the video content. The satellite video services receiver supports a method of managing customer access to events. The method involves the steps of maintaining blackout information for events on a plurality of services, maintaining alternative event identifiers for events on the plurality of services, and processing an access request for a first event on a first service of the plurality of services. The first event corresponds to a first presentation of content, and the blackout information indicates a blackout of the first event. The method denies access to the first event, due to the blackout information, retrieves an alternative event identifier for the first event, and matches the alternative event identifier for the first event to at least one of the alternative event identifiers for events on the plurality of services. In response to the matching step, the method indicates a second event on a second service of the plurality of services, the second event corresponding to a second presentation of the content.

An embodiment of a video services receiver system is also provided. The system provides video content to a display for viewing by a customer. The system includes a receiver interface configured to receive data associated with a plurality of services. The data includes alternative event identifiers associated with events. The system also includes a display interface for the display, at least one memory element configured to store the alternative event identifiers, and a processor coupled to the receiver interface, the display interface, and the at least one memory element. The processor compares an alternative event identifier for a blacked out event to the alternative event identifiers for other events on the plurality of services, and it indicates a second event that conveys the same content as the blacked out event if the alternative event identifier matches one of the alternative event identifiers for the other events.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
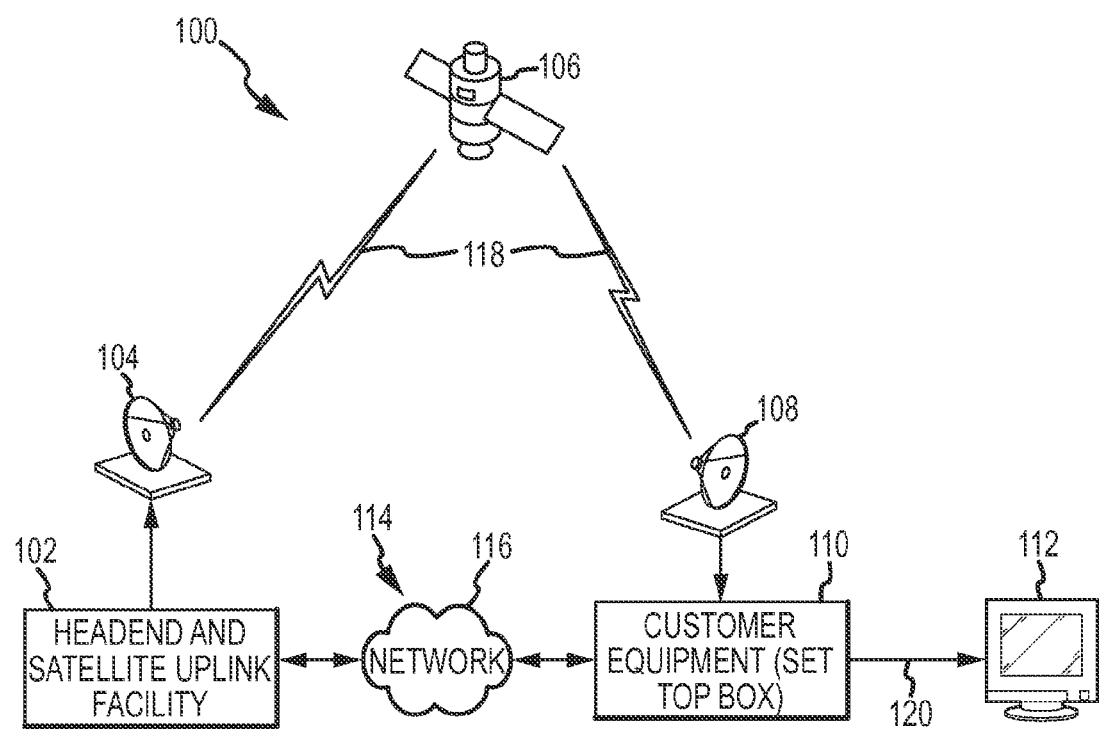
FIG. 1 is a schematic representation of an embodiment of a video services broadcasting system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures might depict exemplary arrangements of elements, additional intervening elements, devices, features, or components may be present in an embodiment of the depicted subject matter.

The techniques and technology described herein can be employed in the context of a video delivery system such as a satellite television system. The disclosed subject matter relates to the broadcasting of video events that might be subjected to blackouts, i.e., certain customers/subscribers will not be allowed to view a blacked out event. More specifically, the disclosed subject matter relates to the processing of alternative event identifiers that indicate whether or not the same content might be available on different services, thus allowing a customer to view content on a second service even though that content might be blacked out on a first service.

FIG. 1 is a schematic representation of an embodiment of a video services broadcasting system 100 that is suitably configured to support the improved event access management techniques described below. System 100 (which has been simplified for purposes of illustration) generally includes, without limitation: a data center 102; an uplink transmit antenna 104; a satellite 106; a downlink receive antenna 108; a video services receiver 110 or other customer equipment; and a display device 112. In certain embodiments, data center 102 communicates with video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

Data center 102 may be deployed as a headend facility and/or a satellite uplink facility for system 100. Data center 102 generally functions to control content and data sent over a high-bandwidth link 118 to any number of downlink receive components (only one downlink receive antenna 108, corresponding to one customer, is shown in FIG. 1). In the embodiment shown in FIG. 1, high-bandwidth link 118 is a direct broadcast satellite (DBS) link that is relayed by satellite 106, although equivalent embodiments could implement high-bandwidth link 118 as any sort of cable, terrestrial wireless and/or other communication link as desired.

Data center 102 includes one or more conventional data processing systems or architectures that are capable of producing signals that are transmitted via high-bandwidth link 118. In various embodiments, data center 102 represents a satellite or other content distribution center having: a data control system for controlling content, signaling information, blackout information, alternative event identifiers, and other data; and an uplink control system for transmitting content, signaling information, blackout information, alternative event identifiers, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on high-bandwidth link 118 in any manner. In the exemplary embodiment illustrated in FIG. 1, uplink transmit antenna 104 is able to transmit data to satellite 106, which in turn uses an appropriate transponder for repeated transmission to downlink receive antenna 108. Additional features and functions of data center 102 and the uplink control system used by system 100 are described below with reference to FIG. 2.

Under normal operating conditions, satellite 106 transmits content, signaling data, blackout information, alternative event identifiers, and other data to downlink receive antenna 108, using high-bandwidth link 118. In practical embodiments, downlink receive antenna 108 represents the customer's satellite dish, which is coupled to video services receiver 110. Video services receiver 110 can be realized as any device, system or logic capable of receiving signals via high-bandwidth link 118 and downlink receive antenna 108, and capable of providing demodulated content to a customer via display device 112. Display device 112 may be, without limitation: a television set; a monitor; a computer display; or any suitable customer appliance with compatible display capabilities. In various embodiments, video services receiver 110 is a conventional set-top box commonly used with DBS or cable television distribution systems. In other embodiments, however, the functionality of video services receiver 110 may be commonly housed within display device 112 itself In still other embodiments, video services receiver 110 is a portable device that may be transportable with or without display device 112. Video services receiver 110 may also be suitably configured to support broadcast television reception, video game playing, personal video recording and/or other features as desired.

During typical operation, video services receiver 110 receives programming (broadcast events), signaling information, and/or other data via high-bandwidth link 118. Video services receiver 110 then demodulates, decompresses, descrambles, and/or otherwise processes the received digital data, and then converts the received data to suitably formatted video signals 120 that can be rendered for viewing by the customer on display device 112. Additional features and functions of video services receiver 110 are described below with reference to FIG. 3.

Figure 2:
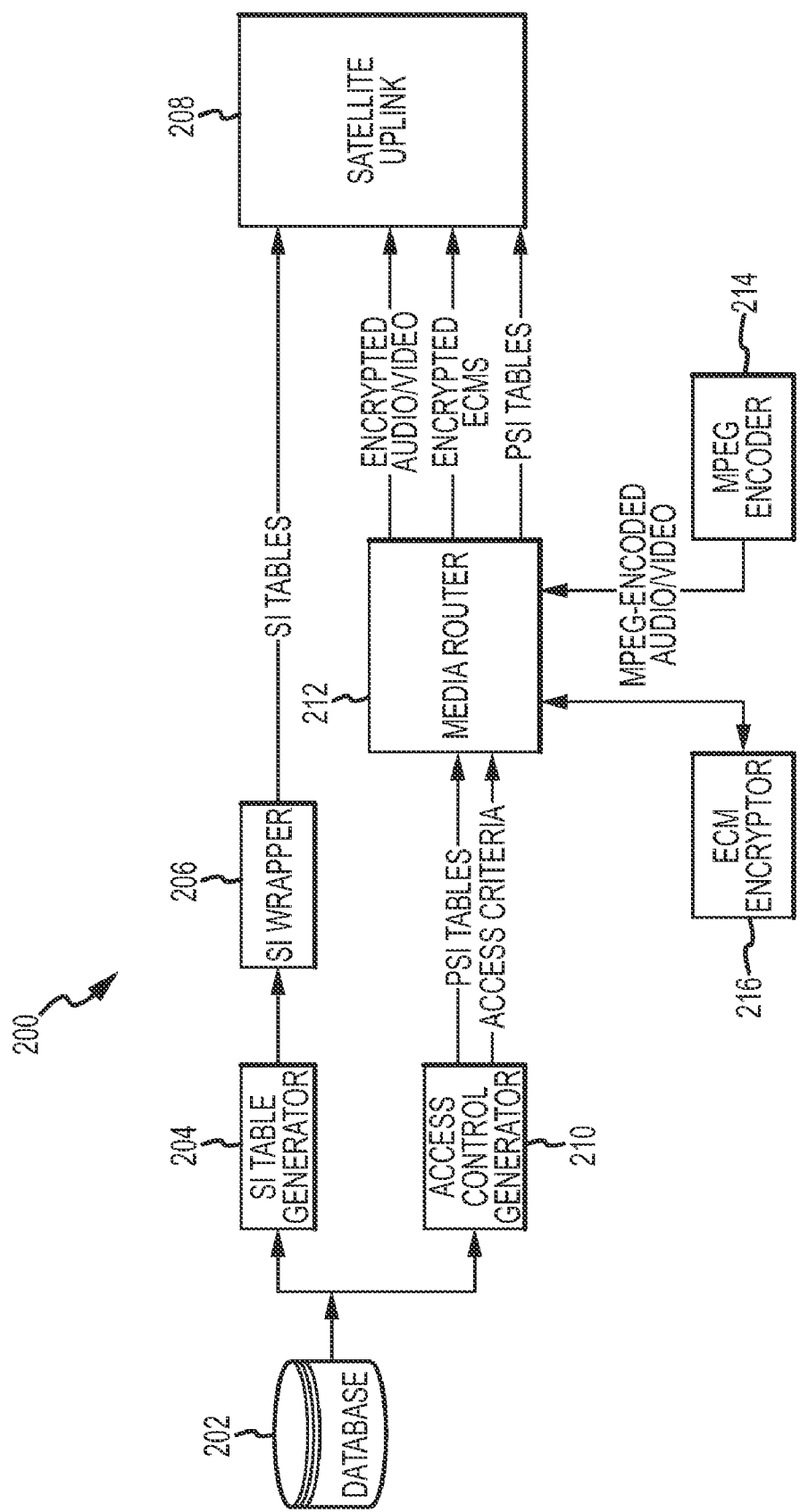
FIG. 2 is a schematic representation of uplink facility equipment suitable for use in the video services broadcasting system shown in FIG. 1.

FIG. 2 is a schematic representation of uplink facility equipment 200 suitable for use in video services broadcasting system 100. Equipment 200 may be realized with any number of hardware, software, firmware, and/or logical processing elements located at, for example, data center 102. The illustrated embodiment includes, without limitation: a database 202; a service information (SI) table generator 204; an SI wrapper component 206; a satellite uplink component 208; an access control generator 210; and a media router 212. These components and elements (and possibly other components) can be coupled together as shown or in any suitable manner to support the transport of data, signaling information, control signals, and commands as needed.

Database 202, which may be implemented as an Information Management System (IMS) database, contains data associated with the services and events broadcast by the system. For this embodiment, database 202 contains data associated with broadcast services, programming, event schedules, access criteria, blackout categories, event identifiers, and the like. The data maintained in database 202 is updated as needed to reflect any changes in the services, events, programming, access criteria, blackout information, and the like. In this regard, certain aspects of system 100 and uplink facility equipment 200 may be consistent with, compliant with, or similar to that described in the document titled "Digital Video Broadcasting (DVB); Specification for Service Information (SI) in DVB Systems," ETSI EN 300 468 V1.7.1, published May 2006 by European Telecommunications Standards Institute (this document is hereinafter referred to as the "DVB Specification"). The relevant content of the DVB Specification is incorporated by reference herein.

SI table generator 204 prepares SI tables (also referred to herein simply as "SI") that convey system-wide information that is sent throughout the system. The SI is "global" in nature in that the same SI is transmitted from the uplink facility to the satellites, and from the satellites to all of the set-top boxes in the system. Thus, the same SI is made available on every transponder in the system. SI wrapper component 206 represents a data spooler that prepares the SI for transmission by satellite uplink component 208. In practice, SI wrapper component 206 can be suitably configured to spool the SI in a continuous or substantially continuous manner such that the SI in the set-top boxes can be updated as frequently as possible.

According to the DVB Specification, SI is "digital data describing the delivery system, content, and scheduling/timing of broadcast data streams, etc." The SI referred to herein generally comports with the definition provided in the DVB Specification. For example, the SI includes at least the following tables: Network Information Table (NIT); Service Description Table (SDT); and Event Information Table (EIT). During operation, a set-top box will process SI to identify/locate a service (i.e., which satellite, which transponder on that satellite, etc.), to determine whether it can tune to that service, and to determine which events/programs are available now and in the future. Due to its "global" nature, the SI represents a relatively large amount of data (e.g., about 40 megabytes).

The NIT includes information about where satellites are located in the sky, the encoding and broadcast parameters utilized by the transponders (e.g., polarization, modulation, etc.), and the particular services associated with each transponder. The SDT includes information about specific services, the associated service identifiers (channel numbers), whether or not any service-level blackouts are applied (if necessary), the name of each service, and the type of video/audio stream associated with each service (e.g., MPEG2 SD, MPEG2 Audio, MPEG4, etc.). The EIT includes information about specific events. For example, the EIT includes, for each event: the event name; an event description; ratings; event-level blackout information (if necessary); and which rights give access to that event (if necessary). The EIT for an event may also include an event identifier (also referred to herein as an "alternative event identifier"), as described in more detail below.

For the embodiments described here, the SI conveys blackout information in a blackout descriptor. The blackout information contained in the SI is referred to herein as "system-wide blackout information." A blackout descriptor could be conveyed in the SDT and/or in the EIT—if conveyed in both, the blackout descriptor in the EIT will override the blackout descriptor in the SDT. In preferred embodiments, the blackout descriptor is conveyed in the EIT and, optionally, in the SDT. The blackout descriptor includes category and subcategory data corresponding to blackout criteria; the category and subcategory data can be processed to determine whether or not a particular set-top box will be subjected to a blackout for a given event. In practice, the category and subcategory data may correspond to relatively large geographic regions and relatively narrow geographic regions, respectively. For example, a blackout category may identify a state or a county, while a corresponding blackout subcategory may identify a specific zip code or area code within that state or county. Thus, a set-top box can process the category and subcategory data to determine whether or not it can access an event to which a blackout is applied.

Notably, the blackout descriptor (or any other portion of the SI) may also include an alternative event identifier for each event referred to in the SI. The alternative event identifier functions to associate or link two or more events together, where those events correspond to the presentation of the same content. For example, if the event in question is a live broadcast of a skateboarding contest on a first service, and the same skateboarding contest is also being broadcast live on a second (different) service, then both of those events will have the same alternative event identifier associated therewith. If more than two different services are broadcasting the same event, then all of those common events will share the same alternative event identifier. Notably, the number of different alternative event identifiers used at any given time may vary depending upon the number of different events referenced by the SI.

In certain embodiments, the alternative event identifier is realized as a string of bits (for example, a 16-bit word), a number, a string of characters, an alphanumeric code, or the like. In preferred embodiments, the alternative event identifier is implemented as a string of bits in a specified field of the blackout descriptor. The number of bits in the alternative event identifier is chosen to ensure that a unique event identifier can be assigned to each event in the SI (if necessary). For the embodiment described here, a specific value for the alternative event identifier is utilized to indicate that the respective event is not available elsewhere, i.e., the event in question is only available on one service. Although the value that indicates only one instance of an event can be arbitrarily chosen, the preferred embodiment utilizes a value of zero to indicate a singular event.

For this example, any nonzero value of the alternative event identifier signifies that at least one other event on a different service corresponds to another presentation of the same content. All of the events that share the same content will have the same nonzero alternative event identifier value. Thus, a nonzero alternative event identifier can be used as a searching key or field. As described in more detail below, the set-top box can search for matching alternative event identifiers and, in response to a match, notify the customer and/or provide access to the events corresponding to the matching event identifiers.

Referring again to FIG. 2, access control generator 210 prepares Program Specific Information tables (also referred to herein simply as "PSI") and access criteria associated with events and programming. The PSI and access criteria are generated on a transponder-specific basis. In other words, access control generator 210 generates respective PSI and access criteria for each transponder in the system. As depicted in FIG. 2, access control generator 210 sends the PSI and access criteria to media router 212 for processing. In a practical embodiment, access control generator 210 communicates with a plurality of media routers (where uplink facility equipment 200 has one media router 212 per transponder). Access control generator 210 can update the PSI and access criteria for a given transponder quickly and frequently, because the data is specific to only one transponder and because the data need not be transmitted globally throughout the entire system. The PSI represents a relatively small amount of data (compared to the SI); for example, the PSI may utilize only one to three kilobytes of data.

Generally, the PSI represents a transport-by-transport mechanism that enables a set-top box to tune to a service. The PSI contains information that a set-top box uses to navigate to a service once it has already tuned to a particular transponder. The PSI includes the information necessary to find the particular audio, video, and other program-related data. For the embodiment described here, the PSI primarily includes at least the following tables: Program Acquisition Table (PAT); Program Map Table (PMT); and Conditional Access Table (CAT). The PAT indicates the packet identifier (PID) corresponding to the PMT for a particular service. The PAT may be redundant or optional for certain system embodiments, for example, in systems where all services are found in the same PMT. The PMT indicates the PIDs corresponding to the audio data, video data, and entitlement control messages (ECMs) for a particular service (ECMs are described in more detail below). The CAT indicates the PID corresponding to entitlement management messages (EMMs) for the service, where an EMM is a subscriber-specific message that conveys any changes to the subscriber's access rights, time zone, zip code, etc. Notably, although the PSI does not actually contain the audio, video, or ECM data for a service, those items are referenced in the PSI using various PIDs.

The access control generator 210 provisions media router 212 with access control data (also referred to as access criteria). This set of data includes authorization information and blackout information. The media router 212 combines the access control data with a cryptographic key which has been used to encipher the video data.

As illustrated in FIG. 2, media router 212 obtains the PSI tables and the access criteria for processing and handling. The system embodiment described here utilizes one media router 212 per transponder (FIG. 2 only depicts one media router 212 for clarity and ease of illustration). Media router 212 generally functions to prepare encrypted audio and video data, ECMs, and PSI, and to send that information to satellite uplink component 208. In this regard, media router 212 may cooperate with an MPEG encoder 214 that is suitably configured to generate MPEG-encoded audio and video data associated with the services supported by the particular transponder. Media router 212 can then encrypt (scramble) the MPEG-encoded audio/video data as needed using an appropriate encryption scheme.

Media router 212 processes the access criteria obtained from access control generator 210, and creates ECMs (one ECM per service) based upon the access criteria. An ECM conveys a control word or data that functions as a decryption or descrambling key for the set-top box. The set-top box utilizes this key to decrypt audio/video data to which it has legitimate access. In certain embodiments, the control word changes frequently to provide additional security (e.g., once every fifteen seconds), and an ECM can be updated very quickly due to its small size. For example, a typical ECM will have a size of about two hundred bytes, thus allowing it to be transmitted from satellite uplink component 208, to a satellite, and down to the set-top box in seconds.

For the embodiment described here, the ECM also conveys information about which rights must be present and valid on the set-top box (more particularly, on the security module of the set-top box) for granting access to the service. Moreover, the ECM may also convey blackout information that dictates whether or not the set-top box will disallow viewing of the service or specified events on the service. As used herein, blackout information, blackout data, and blackout criteria included in, conveyed by, or otherwise associated with an ECM is referred to as "service-specific" blackout information, and such service-specific blackout information is distinguishable and distinct from system-wide blackout information that is conveyed in the SI.

The ECM itself is encrypted or scrambled before being transmitted by satellite uplink component 208. Accordingly, equipment 200 may include or cooperate with a suitably configured ECM encryptor 216 that encrypts the ECMs generated by media router 212 (alternatively, the functionality of ECM encryptor 216 may be integrated into media router 212). ECM encryptor 216 receives unencrypted ECMs from media router 212, encrypts the ECMs using an appropriate encryption scheme or algorithm, and returns the encrypted ECMs to media router 212. Thus, the set-top box must be able to decrypt the received ECM before it can access the control word and other data conveyed in the ECM.

Media router 212 provides the encrypted audio/video data, the encrypted ECMs, and the PSI to satellite uplink component 208, and SI wrapper component 206 provides the SI to satellite uplink component 208. Notably, the SI, PSI, and ECM represent distinct and separate data constructs that are generated and transmitted independently and separately, even though some data, such as blackout information, may be common or redundant.

Figure 3:
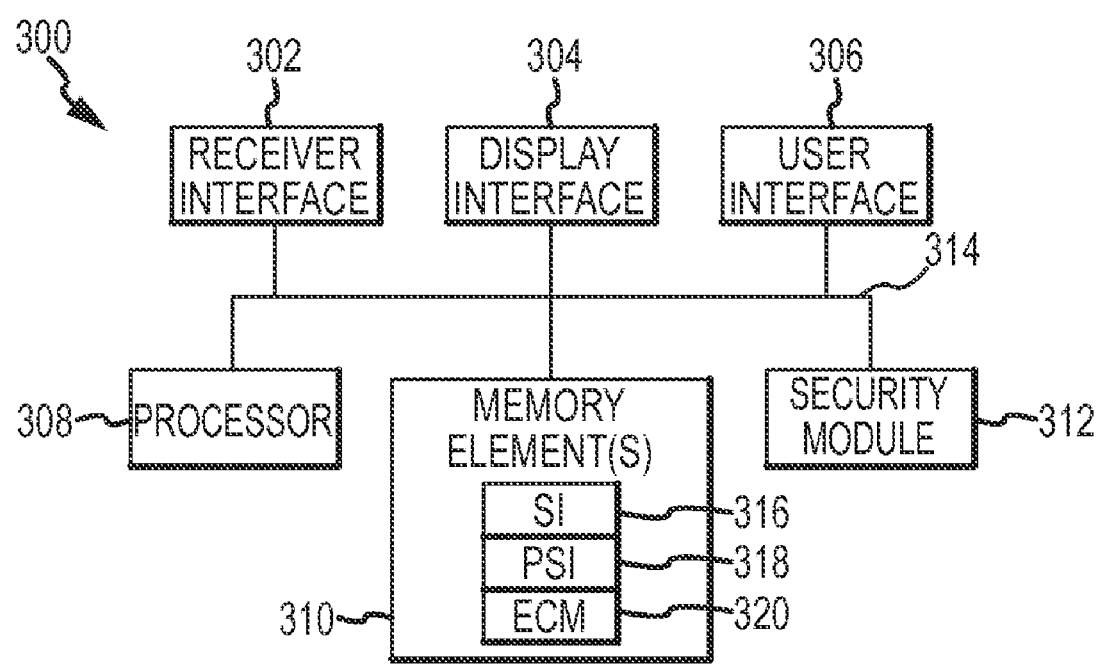
FIG. 3 is a schematic representation of an embodiment of a set-top box suitable for use in the video services broadcasting system shown in FIG. 1.

Referring again to FIG. 1, the encrypted audio/video data, the SI, the encrypted ECMs, and the PSI is transmitted to video services receiver 110, via satellite 106. Video services receiver 110 can then process the received data in an appropriate manner. Referring now to FIG. 3, a schematic representation of an embodiment of a set-top box 300 suitable for use in video services broadcasting system 100 is depicted. Set-top box 300 is configured to receive video content, and to provide the video content to the customer on an appropriate display. This embodiment of set-top box 300 generally includes, without limitation: a receiver interface 302; a display interface 304 for the display; a user interface 306; at least one processor 308; at least one memory element 310; and a security module 312. These components and elements may be coupled together as needed for purposes of interaction and communication using, for example, an appropriate interconnect arrangement or architecture 316. In practice, set-top box 300 will include additional elements and features that support conventional functions and operations.

Receiver interface 302 is coupled to the customer's satellite antenna, and receiver interface 302 is suitably configured to receive and perform front end processing on signals transmitted by satellite transponders. In this regard, receiver interface 302 can receive data associated with any number of services, such as data that represents alternative event identifiers for the events. Receiver interface 302 may leverage conventional design concepts that need not be described in detail here. Display interface 304 is coupled to one or more display elements (not shown) at the customer site. Display interface 304 represents the hardware, software, firmware, and processing logic that is utilized to render graphics, images, video, and other visual indicia on the customer's display. Display interface 304 may leverage conventional design concepts that need not be described in detail here. User interface 306 may include one or more elements, components, or features that accommodate user inputs and/or that provide feedback to the user. For example, user interface 306 may include, without limitation: keys; buttons; switches; a keyboard; a touchpad; a touch screen; a mouse or equivalent pointing device; indicator lights; or the like.

The customer display element can be any television, monitor, or appliance capable of displaying imagery for viewing by one or more customers. In many embodiments, set-top box 300 is able to generate on-screen displays such as windows, menus, graphical user interface (GUI) features, and/or the like on the display element as desired. For example, set-top box 300 may be suitably configured to generate pop-up notifications or windows that indicate whether the customer has access to a selected event, whether a selected event is blacked out, and/or whether the customer has access to other events (on different services) that correspond to a presentation of the same content as a selected event. Set-top box 300 may also be configured to generate graphical program listings and/or graphical timer schedules that convey blackout information, access notifications, or the like.

Processor 308 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, processor 308 may be realized as a microprocessor, a controller, a microcontroller, or a state machine. Moreover, processor 308 may be implemented as a combination of computing devices, e.g., a combination of a digital signal processor and a microprocessor, a plurality of microprocessors, one or more microprocessors in conjunction with a digital signal processor core, or any other such configuration. As described in more detail below, processor 308 may be adapted to compare an alternative event identifier (for a blacked out event) to alternative event identifiers for other events on one or more different services, and processor 308 can indicate or identify other events that convey the same content as the blacked out event if the alternative event identifier matches one of the event identifiers for the other events. If so notified, the customer can then choose to view the common content on a service that is not blacked out.

Memory element 310 may be realized as RAM memory, flash memory, EPROM memory, EEPROM memory, registers, a hard disk, a removable disk, or any other form of storage medium known in the art. In this regard, memory element 310 can be coupled to processor 308 such that processor 308 can read information from, and write information to, memory element 310. In the alternative, memory element 310 may be integral to processor 308. As an example, processor 308 and memory element 310 may reside in a suitably designed ASIC. As depicted in FIG. 3, memory element 310 is preferably configured to store and maintain information, tables, and data received from satellite transponders. For example, memory element 310 can store and maintain the most recent versions of SI table 316, PSI table 318, and ECM data 320 for set-top box 300. More specifically, memory element 310 maintains (by way of SI table 316) system-wide blackout descriptors that convey blackout information and alternative event identifiers for the events referenced by SI table 316.

Security module 312 maintains authorization keys, rights data, blackout criteria (e.g., geographic data such as zip codes) and other information related to access security for set-top box 300. In certain embodiments, security module 312 is realized as a smart card, a portable memory card, or the like, which can be removably installed in set-top box 300. Moreover, security module 312 may include some processing capabilities. As mentioned above, security module 312 may store a decryption key that enables it to decrypt ECMs received by set-top box 300. The decrypted ECM data will contain access criteria that can then be compared against rights information maintained by security module 312. If security module 312 includes the appropriate rights information, then it will provide the necessary video decryption key(s) to set-top box 300, which can then decrypt the scrambled video data using the decryption key(s). On the other hand, if security module 312 does not contain the necessary rights information, then it will deny access to the video data.

Set-top box 300 can tune to a selected service in the following generalized manner. First, set-top box 300 will locate or identify the satellite and transponder that corresponds to the service ID conveyed in the NIT. Set-top box 300 can then locate or identify the desired service in the SDT, locate or identify the desired service in the EIT, and verify that the customer can view that service. If set-top box 300 confirms that the customer can view the service, it will tune to the transponder found in the NIT, acquire the associated PAT, and tune to the PMT referenced in the PAT. Then, set-top box 300 will "listen" for the PIDs for the audio, video, and ECM data, while performing decryption as needed.

A video services receiver such as set-top box 300 receives downlink signals from satellites in the system, and updates the SI, PSI, and ECM data as needed. Event identifiers are updated at the headend facility as needed to indicate whether or not the same content is available in the form of different events on different services. Two events corresponding to two different presentations of the same content may be substantially synchronized in time or they may be time-shifted relative to one another. For example, a first event on a first service may be a first live presentation of content (such as a baseball game), and the second event on a second and different service may be a second live presentation of the same content. In certain situations, the first event is a live presentation of the content, while the second event is delayed in time, relative to the first event. The delay may be unintentional and caused by practical limitations of the data transport architecture, or the delay may be intentional (e.g., a scheduled one hour delay). Blackouts may be applied to the first event and/or to any of the other events that share the same event identifier. For instance, even if the first event is blacked out for the customer, the second event may be accessible and available for viewing by the customer.

Figure 4B:
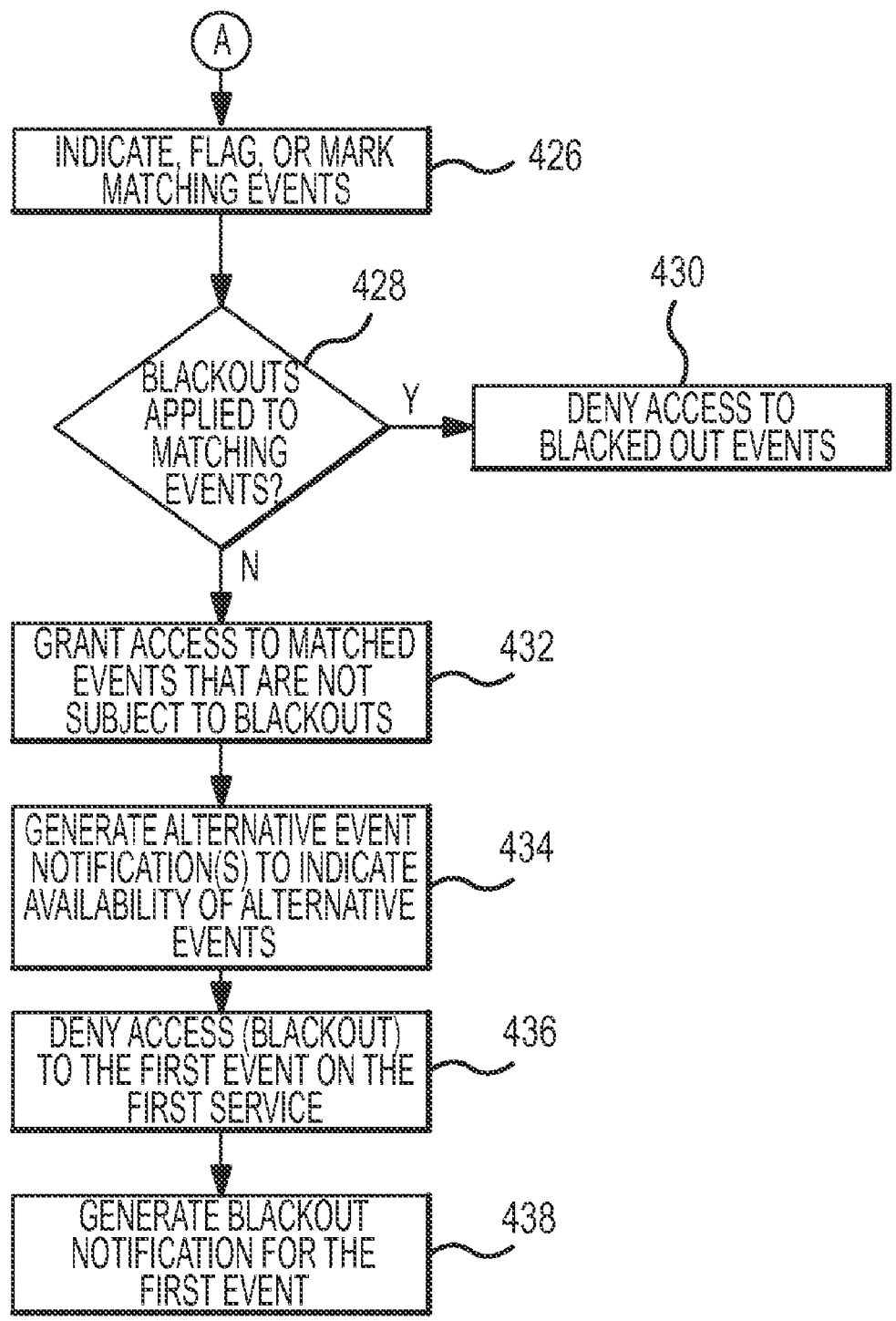
FIG. 4 is a flow diagram of an embodiment of an alternative event access management process, which may be supported by a set-top box in the video services broadcasting system shown in FIG. 1.

FIG. 4 is a flow diagram of an embodiment of an alternative event access management process 400, which may be performed a video services receiver. Process 400 is performed when the set-top box (STB) receives an access request or command for a current event on a service, and the following description of process 400 is in the context of the user tuning to a current event on a service. However, process 400 (or portions thereof) may also be performed when the STB receives a request or command to set a timer for an event on a service, and/or when the STB is displaying a programming guide or listing of available events. The various tasks performed in connection with process 400 may be performed by software, hardware, firmware, or any combination thereof. For illustrative purposes, the following description of process 400 may refer to elements mentioned above in connection with FIGS. 1-3. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Process 400 maintains blackout information (task 402) and alternative event identifiers (task 404) for events on a plurality of different services. As described above, the blackout information and alternative event identifiers are conveyed in the SI tables, preferably in the form of blackout descriptors. At any given time the set-top box (STB) operates using the currently stored blackout information and alternative event identifiers, however, the SI tables (and, therefore, the blackout information and alternative event identifiers) may be updated as frequently as possible in a continuously spooled manner.

Process 400 may process an access request for a current or first event on a service (task 406). For example, process 400 can identify the requested event and its corresponding service when the user has indicated a desire to view that current event. For purposes of this description, it is assumed that the first event corresponds to a first presentation of certain content, e.g., a live football game, a concert, a movie, or the like. The above description of set-top box 300 includes a brief summary of how a current event might be identified when tuning to its service. Once the current event has been identified in an appropriate manner, process 400 can analyze the blackout information for the event (task 408). As described previously, this blackout information (e.g., a blackout descriptor) can be contained in the SI tables maintained at the STB. For this embodiment, if a blackout for the current event is not applied (query task 410), then process 400 will grant access to the requested event (task 412). In other words, if the blackout information authorizes access to the event, then the STB will be allowed to decrypt the associated audio/video data for presentation to the user.

If, however, the first event is blacked out (query task 410), i.e., the blackout information indicates a blackout for the first event, then process 400 proceeds in the following manner. First, process 400 will retrieve, access, or otherwise obtain the alternative event identifier for the first event (task 414). As mentioned previously, each event preferably has a respective event identifier associated therewith, and the event identifiers are accessible for processing by the STB. For this particular embodiment, each event identifier is a 16-bit number, and task 414 represents the STB retrieving the 16-bit number of the first event. The retrieved event identifier can then be used as a key to search for other events on other services, where each of the other events corresponds to a presentation of the same content conveyed by the first event (task 416). In this regard, process 400 may compare the retrieved event identifier to the alternative event identifiers corresponding to any number of events referenced by the SI (task 418). The extent of the searching and comparison will be dictated by the number of events that are currently available and/or by the number of events that will be available within a designated period of time in the future.

For this embodiment, task 418 attempts to match the retrieved event identifier to at least one candidate event identifier for candidate events on the various services supported by the STB (the term "candidate" is used here to indicate that these event identifiers and events need not actually match the retrieved event identifier). For the exemplary embodiment described herein, process 400 searches other events in an attempt to find the 16-bit value that is assigned as the event identifier for the first event. If no matches are found (query task 420), then process 400 will assume that the first event is the "exclusive" source of the desired content. Accordingly, the STB will take the necessary steps to actually deny access and blackout the currently requested event (task 422). In response to denying access and initiating the blackout, the STB can display an appropriate blackout notification (task 424) on the display to inform the customer.

In practice, the alternative event identifier for the first event could match any number of event identifiers associated with any number of different events and different services. For example, the first event may be a basketball game that is simultaneously being broadcast on three other services. Consequently, query task 420 will detect three matches—one for each of the events being broadcast on those three services. In this regard, if query task 420 matches at least one event identifier, then process 400 will indicate, mark, find, flag, or otherwise determine that at least a second event on a second service (different than the first service) corresponds to a second presentation of the desired content (task 426). In practice, task 426 may generate a list of alternative events that have matching event identifiers.

Process 400 may then check whether any blackouts apply to the matching events (query task 428). This check may be necessary if the alternative event identifiers are not correlated with the blackout information. If the blackout information prohibits access to any of the matched events, then process 400 will deny access to those blacked out events (task 430). This stage of process 400 need not be apparent to the customer. In other words, query task 428 and task 430 may represent background tasks that do not generate any display or notification to the customer.

If query task 428 determines that one or more of the matched events are not subject to blackouts, then the STB can grant access to those matched events (task 432). In other words, if the blackout information authorizes access to a matched event, then process 400 will allow the customer to view, record, and/or set a timer for that matched event. In preferred embodiments, process 400 also generates an alternative event notification for the customer (task 434), where this notification indicates the availability of the matched event(s) for access by the customer. This notification may be conveyed as a pop-up display message, as a user interface feature of a program listing or schedule, or the like. This notification may include a selectable list of the matched events, to provide an easy mechanism for the customer to tune to one of the alternative events.

The latter portion of process 400 assumes that the initially requested event is blacked out (query task 410). Accordingly, even though alternative events might be available, the STB will still take the necessary steps to actually deny access and blackout the first event on the first service (task 436). In addition, the STB might display an appropriate blackout notification (task 438) on the display to inform the customer about the blacked out status of the first event. In practice, this blackout notification may be generated in concert with the alternative event notification described above with reference to task 434.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method executable by a video services receiver in a video services broadcasting system to provide access to events by a customer associated with the video services receiver, the method comprising:

receiving, at the video services receiver, system-wide service information (SI) that comprises a Network Information Table (NIT), a Service Description Table (SDT), and an Event Information Table (EIT), the EIT including system-wide event-level blackout descriptors with blackout information for events, and the blackout descriptors comprising alternative event identifiers for events, wherein the SI is globally received by all video services receivers in the video services broadcasting system, each blackout descriptor includes a specified field for its respective alternative event identifier, each alternative event identifier is a string of bits in the specified field, an alternative event identifier value of zero indicates that the respective event is a singular event that is only available on one service, wherein each event referred to in the SI has a corresponding alternative event identifier, and wherein all events that share the same content have the same nonzero alternative event identifier value;

receiving, at the video services receiver, an identification of a first event on a first service receivable by the video services receiver, the first event corresponding to a first presentation of content;

obtaining, by the video services receiver, an alternative event identifier for the first event by processing the blackout descriptors in the EIT;

using the alternative event identifier for the first event to search for alternative events receivable by the video services receiver, each of the alternative events corresponding to a second presentation of the same content presented in the first presentation, wherein searching for the alternative events comprises matching the alternative event identifier for the first event to at least one candidate alternative event identifier for candidate events on services supported by the video services receiver to obtain matching events;

thereafter, the video services receiver checking whether the blackout descriptors in the EIT indicate a blackout for any of the matching events; and thereafter, the video services receiver generating an alternative event notification for the customer, the alternative event notification indicating availability of at least one of the matching events that is not subject to blackouts, for access by the customer on the video services receiver, and the video services receiver denying access to any of the matching events subject to a blackout.

2. The method of claim 1, wherein:
the first event is a first live presentation of the content on the first service; and
at least one of the matching events is a second live presentation of the content on the second service.

3. The method of claim 1, wherein the first event and at least one of the matching events are substantially synchronized in time.

4. The method of claim 1, wherein the first event and at least one of the matching events are time-shifted relative to each other.

5. In a satellite video services receiver configured to receive video content and to control access to the video content and configured to operate in a video services broadcasting system, a method executable by the satellite video services receiver to manage customer access to events, the method comprising:

receiving, at the satellite video services receiver, system-wide service information (SI) that comprises a Network Information Table (NIT), a Service Description Table (SDT), and an Event Information Table (EIT), the EIT including system-wide event-level blackout descriptors with blackout information for events, and the blackout descriptors comprising alternative event identifiers for events, wherein the SI is globally received by all video services receivers in the video services broadcasting system, each blackout descriptor includes a specified field for its respective alternative event identifier, each alternative event identifier is a string of bits in the specified field, an alternative event identifier value of zero indicates that the respective event is a singular event that is only available on one service, wherein each event referred to in the SI has a corresponding alternative event identifier, and wherein all events that share the same content have the same nonzero alternative event identifier value;

maintaining, at the satellite video services receiver, the blackout information for events on a plurality of services receivable by the satellite video services receiver;

maintaining, at the satellite video services receiver, the alternative event identifiers for events on the plurality of services;

processing, by the satellite video services receiver, an access request for a first event on a first service of the plurality of services, the first event corresponding to a first presentation of content, and the blackout information indicating a blackout for the first event;

denying access to the first event due to the blackout information;

retrieving the alternative event identifier for the first event from the blackout descriptors in the EIT;

matching, by the satellite video services receiver, the alternative event identifier for the first event to at least one of the alternative event identifiers in the blackout descriptors in the EIT for alternative events on the plurality of services to obtain matching events, wherein each of the alternative events corresponds to a second presentation of the same content presented in the first presentation;

thereafter, the satellite video services receiver checking whether the blackout descriptors in the EIT indicate a blackout for any of the matching events; and thereafter, indicating, by the satellite video services receiver, at least one of the matching events that is not subject to blackouts, each corresponding to a second presentation of the content, and the satellite video services receiver denying access to any of the matching events subject to a blackout.

6. The method of claim 5, wherein retrieving the alternative event identifier for the first event comprises accessing the blackout descriptors in the EIT of the service information (SI) associated with the first service.

7. The method of claim 6, wherein matching the alternative event identifier comprises accessing the blackout descriptors in the EIT of the SI associated with the plurality of services.

8. A video services receiver system in a video services broadcasting system for providing video content to a display for viewing by a customer, the video services receiver system comprising:

a receiver interface configured to receive data associated with a plurality of services, the data including system-wide service information (SI) that comprises a Network Information Table (NIT), a Service Description Table (SDT), and an Event Information Table (EIT), the EIT including system-wide event-level blackout descriptors with blackout information for events, and the blackout descriptors comprising alternative event identifiers for events, wherein the SI is globally received by all video services receivers in the video services broadcasting system, each blackout descriptor includes a specified field for its respective alternative event identifier, each alternative event identifier is a string of bits in the specified field, an alternative event identifier value of zero indicates that the respective event is a singular event that is only available on one service, wherein each event referred to in the SI has a corresponding alternative event identifier, and wherein all events that share the same content have the same nonzero alternative event identifier value;

a display interface for the display;

at least one memory element configured to store the received alternative event identifiers; and a processor coupled to the receiver interface, the display interface, and the at least one memory element, the processor being configured to compare an alternative event identifier for a blacked out event to the alternative event identifiers for other events on the plurality of services, and the processor being configured to identify candidate events that convey the same content as the blacked out event if the alternative event identifier for the blacked out event matches the alternative event identifiers for the candidate events, wherein the processor checks whether the blackout descriptors in the EIT indicate a blackout for any of the matching events, and thereafter generates an alternative event notification that indicates availability of at least one of the matching events that is not subject to blackouts, for access by the customer on the video services receiver system, while denying access to any of the matching events subject to a blackout.

9. The system of claim 8, wherein the blacked out event and at least one of the matching events are substantially synchronized in time.

10. The system of claim 8, wherein at least one of the matching events is delayed in time, relative to the blacked out event.

* * * * *